US008819587B1

(12) United States Patent
Shrum et al.

(10) Patent No.: US 8,819,587 B1
(45) Date of Patent: Aug. 26, 2014

(54) METHODS OF MANAGING ITEMS IN A SHARED WORKSPACE (71) Applicants: Kenneth William Shrum, Fort Collins, CO (US); Theodore Yining Chen, Boulder, CO (US); Michael Sorvillo, New York, NY (US); Scott Matthew Johnston, Darien, CT (US)

(72) Inventors: Kenneth William Shrum, Fort Collins, CO (US); Theodore Yining Chen, Boulder, CO (US); Michael Sorvillo, New York, NY (US); Scott Matthew Johnston, Darien, CT (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/663,804

(22) Filed: Oct. 30, 2012

(51) Int. Cl.
G06F 3/048 (2013.01)
G06F 3/0482 (2013.01)
(52) U.S. Cl.
CPC ................................ *G60F 3/0481* (2013.01);
*G06F 3/0482* (2013.01)
USPC ........................................................ 715/810
(58) Field of Classification Search
None
See application file for complete search history.

(56) References Cited

U.S. PATENT DOCUMENTS

| 4,694,406 | A | 9/1987 | Shibui et al. |
|---|---|---|---|
| 4,853,878 | A | 8/1989 | Brown |
| 5,038,138 | A | 8/1991 | Akiyama et al. |
| 5,175,813 | A | 12/1992 | Golding et al. |
| 5,317,306 | A | 5/1994 | Abraham et al. |
| 5,361,361 | A | 11/1994 | Hickman et al. |
| 5,394,523 | A | 2/1995 | Harris |
| 5,398,310 | A | 3/1995 | Tchao et al. |
| 5,506,951 | A | 4/1996 | Ishikawa |
| 5,526,480 | A | 6/1996 | Gibson |
| 5,563,996 | A | 10/1996 | Tchao |
| 5,610,828 | A | 3/1997 | Kodosky et al. |
| 5,623,613 | A | 4/1997 | Rowe et al. |
| 5,682,511 | A | 10/1997 | Sposato et al. |
| 5,732,399 | A | 3/1998 | Katiyar et al. |
| 5,737,553 | A | 4/1998 | Bartok |
| 5,812,123 | A | 9/1998 | Rowe et al. |
| 5,870,770 | A | 2/1999 | Wolfe |
| 5,894,311 | A | 4/1999 | Jackson |
| 5,903,267 | A | 5/1999 | Fisher |
| 5,905,863 | A | 5/1999 | Knowles et al. |
| 5,918,223 | A | 6/1999 | Blum et al. |
| 5,918,233 | A | 6/1999 | La Chance et al. |
| 5,930,801 | A | 7/1999 | Falkenhainer et al. |
| 5,948,058 | A | 9/1999 | Kudoh et al. |
| 5,999,159 | A | 12/1999 | Isomura |
| 5,999,179 | A | 12/1999 | Kekic et al. |

(Continued)

FOREIGN PATENT DOCUMENTS

| CN | 1194703 | 9/1998 |
|---|---|---|
| CN | 1285557 | 2/2001 |

(Continued)

*Primary Examiner* — Ryan Pitaro
*Assistant Examiner* — Maryam Ipakchi
(74) *Attorney, Agent, or Firm* — Young Basile Hanlon & MacFarlane P.C.

(57) ABSTRACT

A method includes transmitting, from a storage system to a user system, information that, when processed by the user system, causes the user system to display a current view representing the one or more items. The method also includes selecting, at the storage system in response to a first user input signal that identifies at least one item from one or more items that are stored at the storage system, a removal operation based on one or more predetermined criteria, wherein the one or more predetermined criteria include a view type of the current view. The method also includes performing, at the storage system, the removal operation with respect to the at least one item.

17 Claims, 9 Drawing Sheets

(56) References Cited

U.S. PATENT DOCUMENTS

| | | | |
|---|---|---|---|
| 6,008,803 | A | 12/1999 | Rowe et al. |
| 6,026,388 | A | 2/2000 | Liddy et al. |
| 6,034,688 | A | 3/2000 | Greenwood et al. |
| 6,052,121 | A | 4/2000 | Webster et al. |
| 6,078,306 | A | 6/2000 | Lewis |
| 6,088,696 | A | 7/2000 | Moon et al. |
| 6,154,740 | A | 11/2000 | Shah |
| 6,184,881 | B1 | 2/2001 | Medl |
| 6,252,597 | B1 | 6/2001 | Lokuge |
| 6,272,537 | B1 | 8/2001 | Kekic et al. |
| 6,289,361 | B1 | 9/2001 | Uchida |
| 6,300,967 | B1 | 10/2001 | Wagner et al. |
| 6,340,979 | B1 | 1/2002 | Beaton et al. |
| 6,348,935 | B1 | 2/2002 | Malacinski et al. |
| 6,380,947 | B1 | 4/2002 | Stead |
| 6,388,682 | B1 | 5/2002 | Kurtzberg et al. |
| 6,396,513 | B1 | 5/2002 | Helfman et al. |
| 6,424,995 | B1 | 7/2002 | Shuman |
| 6,442,440 | B1 | 8/2002 | Miller |
| 6,499,026 | B1 | 12/2002 | Rivette et al. |
| 6,529,744 | B1 | 3/2003 | Birkler et al. |
| 6,631,398 | B1 | 10/2003 | Klein |
| 6,842,653 | B2 | 1/2005 | Weishut et al. |
| 6,889,233 | B2 | 5/2005 | Lin et al. |
| 7,028,263 | B2 | 4/2006 | Maguire |
| 7,085,755 | B2 | 8/2006 | Bluhm et al. |
| 7,289,973 | B2 * | 10/2007 | Kiessig et al. ........................ 1/1 |
| 7,360,175 | B2 | 4/2008 | Gardner et al. |
| 7,412,660 | B2 | 8/2008 | Donalson |
| 7,487,458 | B2 | 2/2009 | Jalon et al. |
| 7,512,636 | B2 | 3/2009 | Verma et al. |
| 8,195,714 | B2 | 6/2012 | McKibben et al. |
| 2002/0120633 | A1 | 8/2002 | Stead |
| 2003/0163537 | A1 | 8/2003 | Rohall et al. |
| 2003/0218637 | A1 | 11/2003 | Sloo et al. |
| 2004/0260756 | A1 | 12/2004 | Forstall et al. |
| 2005/0120361 | A1 | 6/2005 | Bailey et al. |
| 2008/0059495 | A1 * | 3/2008 | Kiessig et al. ................. 707/100 |
| 2009/0138808 | A1 * | 5/2009 | Moromisato et al. ......... 715/758 |
| 2010/0183246 | A1 * | 7/2010 | King et al. .................... 382/305 |
| 2010/0306283 | A1 | 12/2010 | Johnson et al. |
| 2011/0066951 | A1 * | 3/2011 | Ward-Karet et al. ......... 715/744 |
| 2011/0085211 | A1 * | 4/2011 | King et al. .................... 358/474 |
| 2011/0087690 | A1 | 4/2011 | Cairns |
| 2011/0239134 | A1 * | 9/2011 | Spataro et al. ................ 715/753 |
| 2011/0239135 | A1 * | 9/2011 | Spataro et al. ................ 715/753 |
| 2011/0249024 | A1 * | 10/2011 | Arrasvuori et al. ........... 345/629 |
| 2011/0252093 | A1 * | 10/2011 | Spataro et al. ................ 709/204 |
| 2011/0307804 | A1 * | 12/2011 | Spierer ........................ 715/752 |
| 2012/0030264 | A1 | 2/2012 | Horn |
| 2012/0110443 | A1 | 5/2012 | Lemonik et al. |
| 2012/0198356 | A1 * | 8/2012 | Ding et al. .................... 715/752 |
| 2012/0204095 | A1 * | 8/2012 | Gao et al. ...................... 715/234 |
| 2012/0216128 | A1 * | 8/2012 | Ding et al. .................... 715/752 |
| 2012/0240056 | A1 * | 9/2012 | Webber ....................... 715/752 |
| 2012/0240061 | A1 * | 9/2012 | Hillenius et al. .............. 715/753 |
| 2013/0014023 | A1 * | 1/2013 | Lee et al. ...................... 715/751 |
| 2013/0055105 | A1 * | 2/2013 | Spierer ........................ 715/752 |

FOREIGN PATENT DOCUMENTS

| | | |
|---|---|---|
| EP | 1077417 | 2/2001 |
| EP | 123434 | 8/2002 |
| JP | 408286871 | 11/1996 |
| JP | 09326822 | 12/1997 |
| JP | 2001325296 | 11/2001 |
| JP | 2003271526 | 9/2003 |
| WO | WO9724684 | 7/1997 |
| WO | WO9744748 | 11/1997 |
| WO | WO0123995 | 4/2001 |

* cited by examiner

METHODS OF MANAGING ITEMS IN A SHARED WORKSPACE

BACKGROUND

The disclosure herein relates generally to managing items in workspaces that allow items to be shared with other users, which may be referred to herein as "shared workspaces." In some shared workspaces, users are able to view and access items that they own or items that are "shared" with them.

Shared workspaces can present one or more views that are similar to computer file systems, and include representations of items that are visible to the user. Different types of views can be implemented in a shared workspace. As an example, folder-based views allow users to group items in any desired manner within folders. In some shared workspaces, a single item can be included in multiple folders. As another example, attribute-based views can group items based on attributes that are associated with items. Examples of attribute-based views include a view showing items that are shared with the user by other users, a view showing items that were recently accessed by the user, a view showing items that the user has indicated are "favorite" items, and a view showing items that the user has tagged with a specific keyword.

When a user has no further need or desire to view or access an item, multiple distinct separate operations may exist for removing the item from a view. As examples, the item can be deleted, the item can be excluded or otherwise hidden from the view and, in situations where the item is present in multiple folders, and the item can be removed from the folder. Each of these operations can behave differently and can have different consequences with regard to the continued visibility of the item with respect to other views and with respect to other users. As a result, selection of one of these operations by a user could lead to unintended results, or could appear to have done nothing in situations where the selected operation has no impact on the current view.

SUMMARY

The disclosure relates to managing items in a shared workspace.

One aspect of the disclosed embodiments is a method that includes transmitting, from a storage system to a user system, information that, when processed by the user system, causes the user system to display a current view representing the one or more items. The method also includes selecting, at the storage system in response to a first user input signal that identifies at least one item from one or more items that are stored at the storage system, a removal operation based on one or more predetermined criteria, wherein the one or more predetermined criteria include a view type of the current view. The method also includes performing, at the storage system, the removal operation with respect to the at least one item.

Another aspect of the disclosed embodiments is a storage medium that includes program instructions executable by one or more processors that, when executed, cause the one or more processors to perform operations. The operations include transmitting, from a storage system to a user system, information that, when processed by the user system, causes the user system to display a current view representing the one or more items. The operations further include selecting, at the storage system in response to a first user input signal that identifies at least one item from one or more items that are stored at the storage system, a removal operation based on one or more predetermined criteria, wherein the one or more predetermined criteria include a view type of the current view. The operations further include performing, at the storage system, the removal operation with respect to the at least one item.

Another aspect of the disclosed embodiments is an apparatus, that includes one or more processors; and one or more memory devices for storing program instructions used by the one or more processors. The program instructions, when executed by the one or more processors, cause the one or more processors to transmit, from a storage system to a user system, information that, when processed by the user system, causes the user system to display a current view representing the one or more items. The program instructions further cause the one or more processors to select, at the storage system in response to a first user input signal that identifies at least one item from one or more items that are stored at the storage system, a removal operation based on one or more predetermined criteria, wherein the one or more predetermined criteria include a view type of the current view. The program instructions further cause the one or more processors to perform, at the storage system, the removal operation with respect to the at least one item.

BRIEF DESCRIPTION OF THE DRAWINGS

The description herein makes reference to the accompanying drawings wherein like reference numerals refer to like parts throughout the several views, and wherein.

DETAILED DESCRIPTION

The disclosure herein relates managing items in a shared workspace. The systems and methods taught herein can be applied to allow a single type of user input, such as a clicking an on-screen button, dragging an item to an icon, or performing a predetermined gesture, to trigger selection of a removal operation based on one or more predetermined criteria. Removal operations can include deleting an item, removing an item from a folder-based view, or excluding an item from an attribute-based view. The removal operation can be selected on the basis of contextual information that is indicative of the user's intent, such as whether the user is the owner of the item, and the type of view that is currently being displayed to the user when the interface element is activated. The systems and methods taught herein can include a confirmation message that clearly indicates the nature of the removal operation that was performed in response to the user input, and can provide the user with an opportunity to undo the removal operation and/or select an alternative removal operation.

Figure 1:
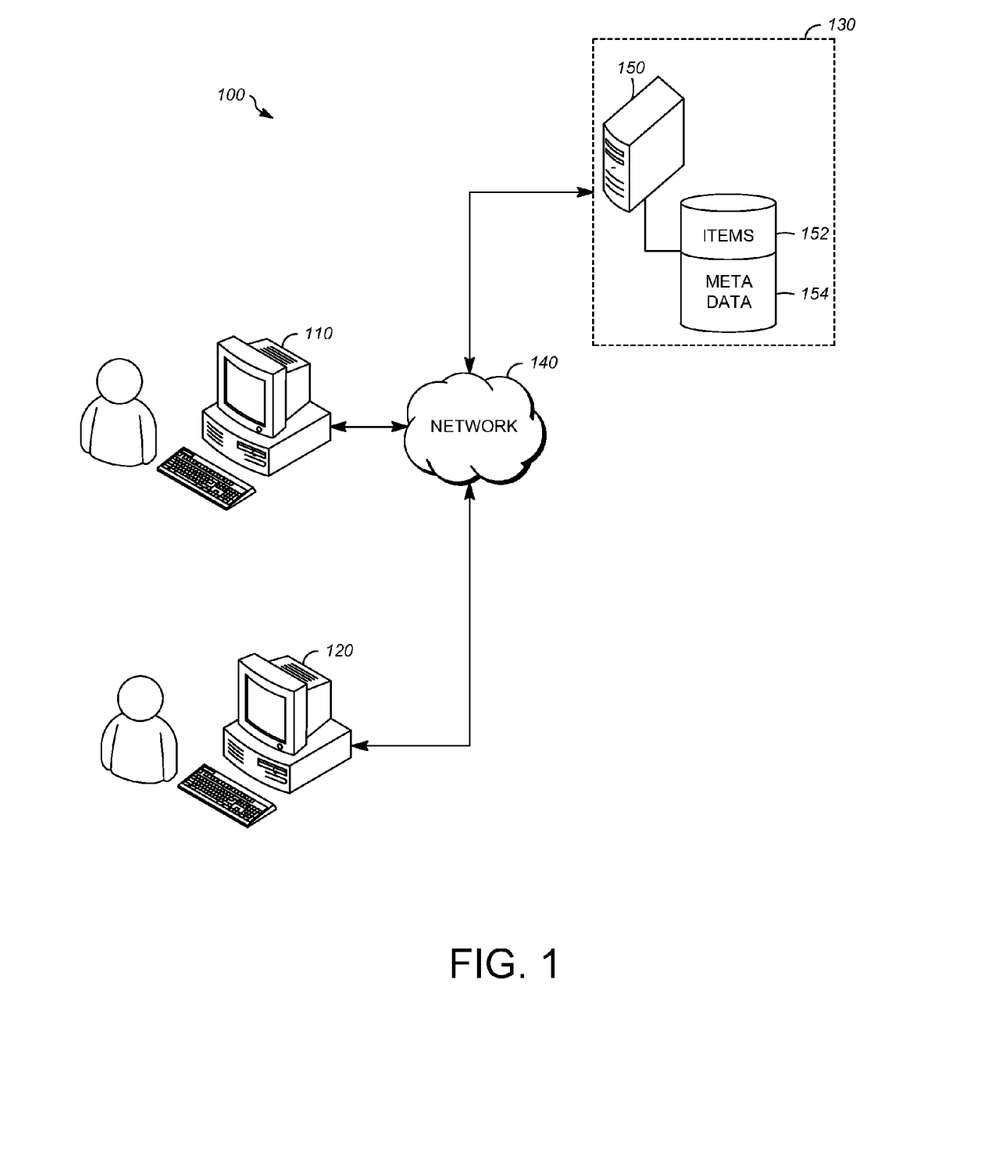
FIG. 1 is a block diagram showing an example of a system for managing items in a shared workspace.

FIG. 1 shows an example of a system 100 for managing a shared workspace. The system 100 can include a user system 110, one or more third-party user systems 120, and a storage system 130 that are in communication via a network 140. The user system 110 and the third-party user systems 120 can each be any manner of computer or computing device, such as a desktop computer, a laptop computer, a tablet computer, or a smart-phone (a computationally-enabled mobile telephone). The storage system 130 can include one or more server computers such as the host computing device 150. The user system 110, the third-party user systems 120, and the storage system 130 can each be implemented as a single system, multiple systems, distributed systems, or in any other form. The network 140 can be one or more communications networks of any suitable type in any combination, including wireless networks, wired networks, local area networks, wide area networks, cellular data networks, and the internet.

In the system 100, a shared workspace is implemented by the storage system 130. As used herein, a shared workspace is any manner of system, program, or interface that allows users to view and/or access items and share items with other users. As one example, a shared workspace can be a network or cloud-based file storage system. As another example, a shared workspace can be a collaborative document editing system.

One or more items 152 can be stored at the storage system 130. As examples, the items 152 can include data files, documents such as word processing documents or spreadsheet documents, images, video files, and audio files. One or more metadata attributes 154 can be associated with each of the items 152. As examples, the metadata attributes 154 can include the identities of one or more owners of the items 152, the identities of one or more folders in which the items 152 are included, the identities of non-owner third-party users that are allowed to view and/or access the items 152, and any other type of data that is or can be tracked with respect to the items 152.

Figure 2:
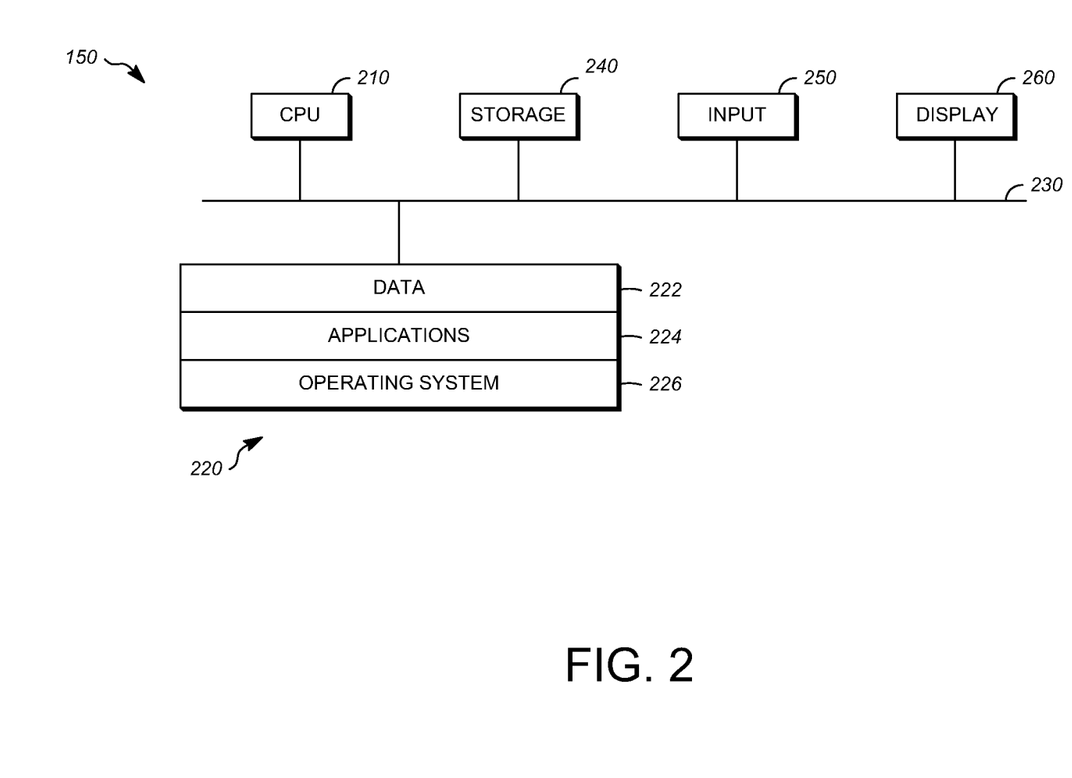
FIG. 2 is a block diagram showing an example of a host computer.

FIG. 2 is a block diagram of an example of a hardware configuration for the host computing device 150 that can be utilized to implement the system 100. The same hardware configuration or a similar hardware configuration can be used to implement the user system 110 and the third-party user systems 120. The host computing device 150 can include a CPU 210. The CPU 210 of the host computing device 150 can be conventional central processing units. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The host computing device 150 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 1 depicts the CPU 210 and the memory 220 of the host computing device 150 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines performing the operations of the host computing device 150. Although depicted here as a single bus, the bus 230 of each of the host computing device 150 can be composed of multiple buses. Further, the storage device 140 of each of the host computing device 150 can be directly coupled to the other components of the respective host computing device 150 or can be accessed via a network and can comprise a single integrated unit such as a memory card or multiple units such as multiple memory cards. The host computing device 150 can thus be implemented in a wide variety of configurations.

Figure 3A:
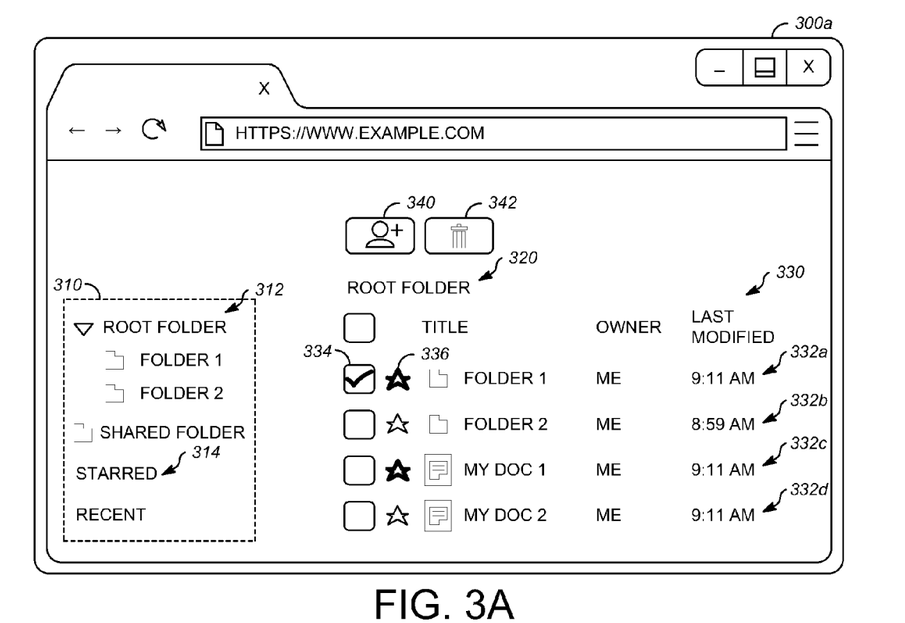
FIGS. 3A-3B are illustrations showing a first example removal operation.
Figure 3B:
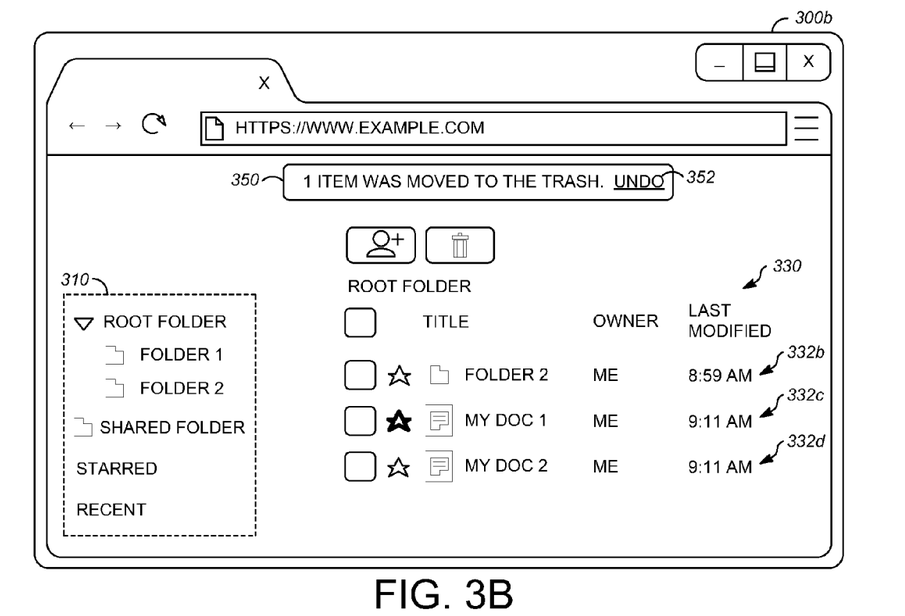

FIGS. 3A-3B are illustrations showing a first example removal operation that is performed in the context of a folder-based view of the shared workspace.

A first folder-based view 300A (FIG. 3A) of the shared workspace includes a navigation area 310, a view title 320, an item list 330, and one or more user-operable interface elements such as a share button 340 and a remove button 342 that are operable to perform operations with respect to one or more selected items from the item list 330, as will be explained in detail herein.

The navigation area 310 can include a plurality of user-operable interface elements that allow a user to select a current view from a plurality of alternative views. In response to selection of one of the alternative views, for example by a user input at the user system 110, a user input signal can be generated at the user system 110 and transmitted to the storage system 130. The storage system 130 can, in response, cause information to be transmitted to the user system 110 that, when processed by the user system 110, causes the user system to display the selected view. As an example, the navigation area 310 can include one or more folder-based view buttons 312 that correspond to folder-based views, and one or more attribute-based view buttons 314 that correspond to attribute-based views. In some shared workspaces, folder-based views are not user-specific. Multiple users can access the same folder-based view, and all of the users will see the same items in a particular folder-based view. Attribute-based views can be specific to the current user. Attribute-based views can be defined at least in part based on data that is associated with the current user. In some implementations, attribute-based views cannot be shared among multiple users.

The item list 330 is populated with items that correspond to the currently displayed view. In this example, the first folder-based view 300A is a folder-based view having the view title 320 of "root folder" and includes information representing a first item 332A, information representing a second item 332B, information representing a third item 332C, and information representing a fourth item 332D. The first through fourth items 332A-332B can be selected for inclusion in the first folder-based view 300A based on, for example, metadata attributes that are associated with each item, wherein the metadata attributes identify each of the first through fourth items 332A-332D as being present in the root folder.

The item list 330 can include one or more interface elements that are associated with the information describing each of the first through fourth items 332A-332D. For example, each of the first through fourth items 332A-332D can be associated with a selection box 334 that is operable by the user to indicate whether operations associated with interface elements such as the share button 340 and the remove button 342 are to be applied to respective ones of the first through fourth items 332A-332D. Additional interface elements 336 can also be associated with the information describing each of the first through fourth items 332A-332D. In the illustrated example, the additional interface element 336 is provided in the form of a user operable control that indicates whether each of the items 332a-332D is to be included in an attribute-based view of the user's favorite items, and operation of the additional interface element 336 can cause information to be stored as a metadata attribute that represents the user's selection.

In the first folder-based view 300A, the user has activated the selection box 334 that is associated with the first item 332A, which, in this example, is titled "Folder 1." The user can then activate the remove button 342, such as by clicking the remove button 342. This results in a user input signal that identifies one or more items with respect to which the user desires a removable operation to be performed. In this example, activation of the remove button 342 causes the input signal to identify the first item 332A. The input signal can be transmitted from the user system 110 to the storage system 130 in the form of a removal request with respect to the first item 332A.

In response to the removal request, the storage system 130 can select a removal operation to be performed with respect to the first item 332A. The removal operation can be selected based on one or more predetermined criteria. For example, the predetermined criteria can include the type of view from which the removal request originated and whether the user is the owner of the item with respect to which the removal request is made. In this example, the removal request is made in the context of a folder-based view. Based on the criteria of the current view being a folder based view, the storage system 130 can determine that the removal operation intended by the user is likely to be either removal of the first item 332A from the root folder or deletion of the first item 332A. The storage system 130 can select from these alternative removal operations based on further criteria, such as whether the first item 332A is also present within other folders or based on whether the user is the owner of the first item 332A. In this example, the storage system 130 selects deletion of the first item 332A based on its determination that the user is the owner of the first item 332A. Upon selecting the removal operation, the storage system 130 then performs the selected removal operation.

Subsequent to performing the selected removal operation, the storage system 130 transmits information to the user system 110 that, when processed by the user system 110, causes the user system to display an updated first folder-based view 300B. The updated first folder-based view 300B includes the navigation area 310, the view title 320, the item list 330, the share button 340, and the remove button 342.

The updated folder-based view 300B can also include a confirmation message 350 that identifies the removal operation that was performed by the storage system 130 in response to the removal request. In this example, the confirmation message 350 states "one item was moved to the trash." Thus, the confirmation message 350 provides feedback to the user that describes the operation that was performed by the storage system 130 and can serve to notify the user that the removal operation was not the operation that they intended in instances where this is the case, such as where the user intended to remove the item from the current folder but not delete the item.

The confirmation message 350 can also include a user operable interface element that allows the user to reverse and/or change the removal operation that was performed. As one example, an undo link 352 is included in the confirmation message 350 in the form of a user-operable hyperlink that can be utilized by the user to transmit an undo request to the storage system 130. The storage system 130 can reverse the removal operation in response to the undo request. Reversing the removal request can include returning an item and/or a view to the state that it was in prior to the removal operation. As an alternative, the user-operable interface element, such as a hyperlink, could be included to transmit a request to perform an alternative operation such as removal of the item to the storage system 130, wherein the storage system 130 can reverse the removal operation and perform the alternative operation with respect to the item in response to the alternative operation request.

Figure 4A:
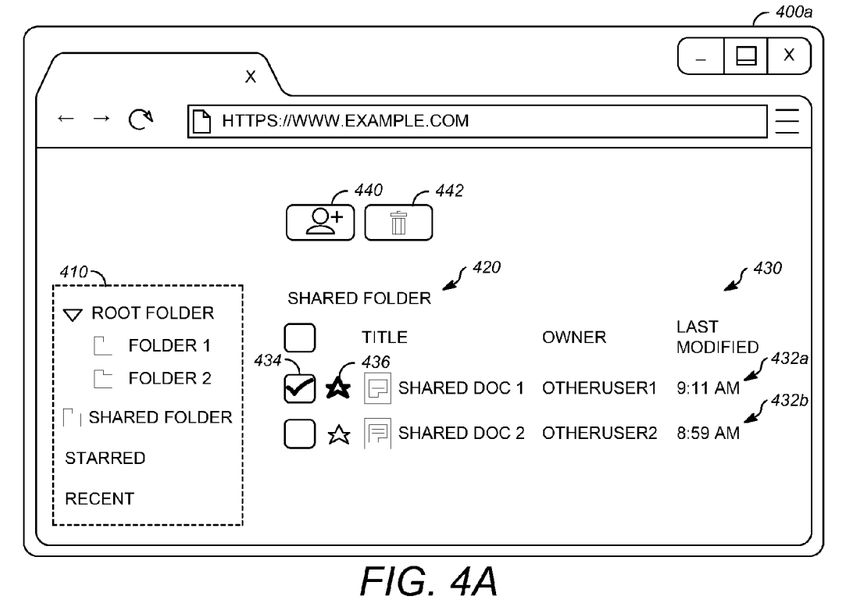
FIGS. 4A-4B are illustrations showing a second example removal operation.
Figure 4B:
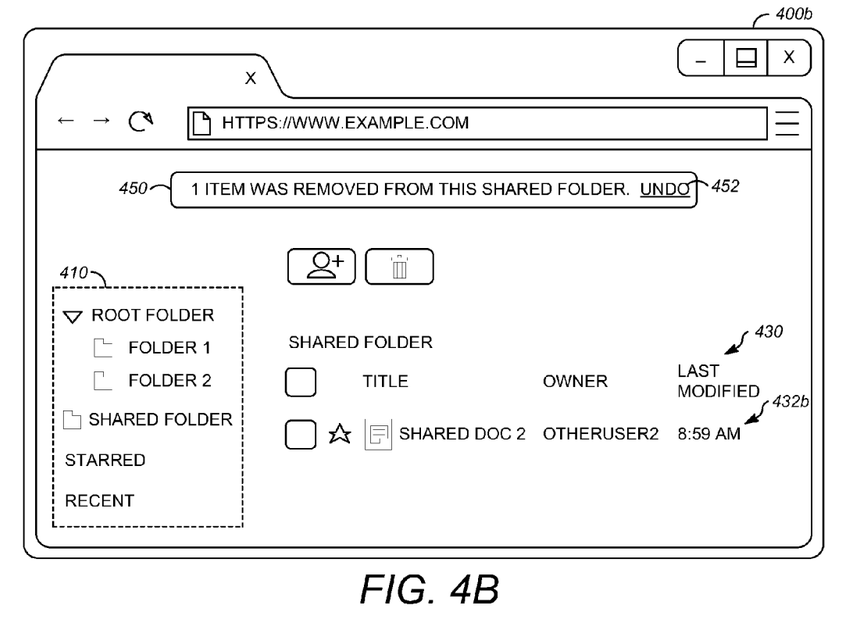

FIGS. 4A-4B are illustrations showing a second example removal operation that is performed in the context of a folder-based view of the shared workspace.

A second folder-based view 400A (FIG. 4A) includes navigation area 410, a view title 420, an item list 430, a share button 440, and a remove button 442. The item list 430 includes information describing a first item 432A and a second item 432B. In this example, the second folder-based view 400A is of a view titled "shared folder" and represents items within a folder that has been shared with the user of the user system 110 by another user of one of the third-party user systems 120. Accordingly, the current user is not the owner of the first item 432A or the second item 432B.

In this example, the first item 432A is selected using a selection box 434. In response to a user input at the user system 110, such as user activation of the remove button 342, an input signal is generated and is transmitted from the user system 110 to the storage system 130 in the form of a removal request with respect to the first item 432A.

In response to the removal request, the storage system 130 selects a removal operation to be performed with respect to the first item 432A. As an example, the storage system can determine that the first item 432A is intended to be removed from the shared folder based on criteria including the view type, which in this case is a folder-based view, and ownership of the first item 432A, which in this case is not owned by the user. The selection of a removal operation can further be based on whether or not the first item 432A exists in other folders in addition to the folder corresponding to the second folder-based view 400A.

In response to determining that the first item 432A should be removed from the second folder-based view 400A, the storage system 130 performs the selected removal operation and transmits information to the user system 110 that, when processed by the user system 110, causes an updated second folder based view 400B (FIG. 4B) to be displayed at the user system 110. The updated second folder-based view 400B includes a confirmation message 450. The confirmation message 450 states "one item was removed." The confirmation message 450 can further include an undo link 452 that, when activated by the user, is operable to transmit an input signal to the storage system 130 in the form of an undo request, as previously discussed.

Figure 5A:
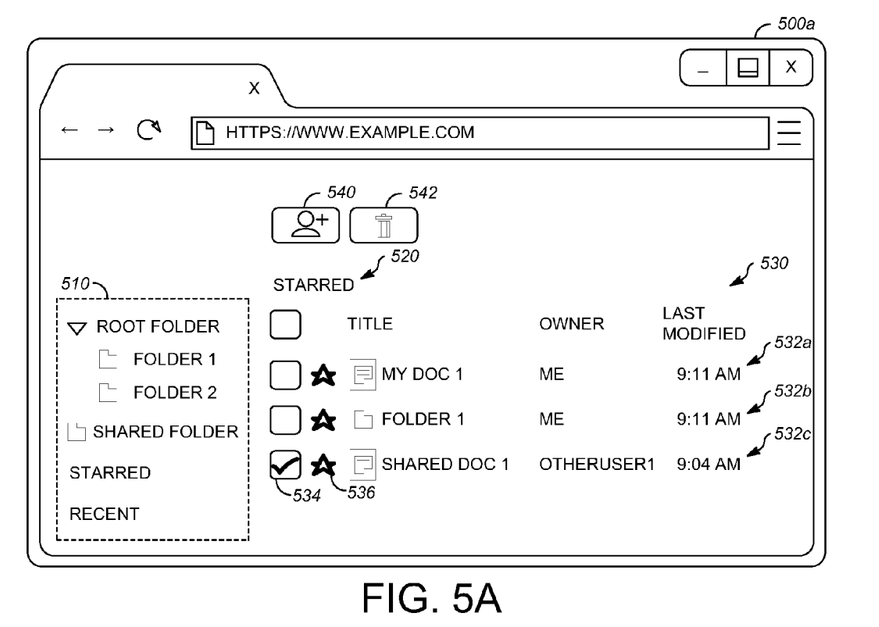
FIGS. 5A-5B are illustrations showing a third example removal operation.
Figure 5B:
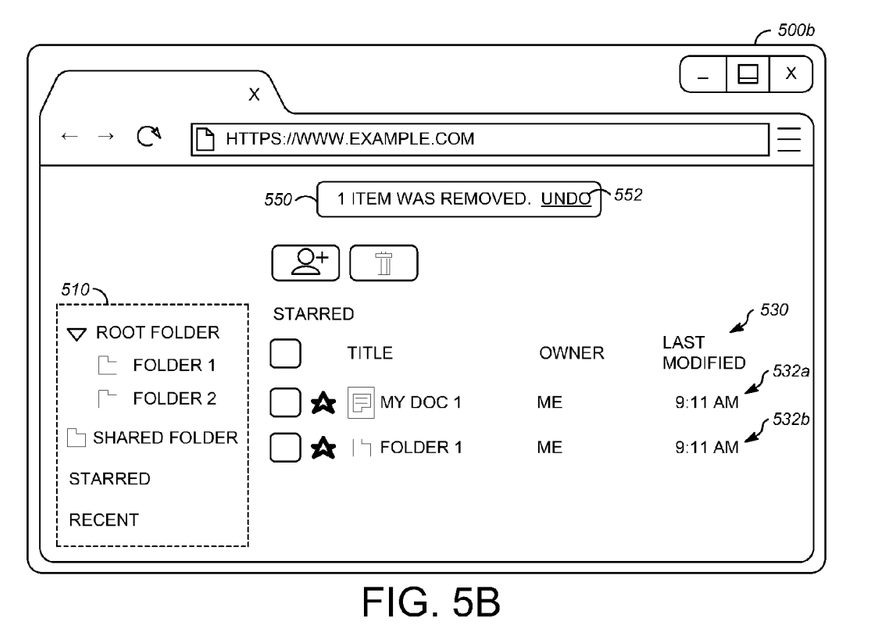

FIGS. 5A-5B are illustrations showing a third example removal operation that is performed in the context of an attribute-based view of the shared workspace.

A first attribute-based view 500A of the shared workspace includes a navigation area 510, a view title 520, an item list 530, a share button 540, and a remove button 542. The first attribute-based view 500A includes items matching a particular metadata attribute, which in this case is designation as a favorite item by the user. The item list 530 includes a first item 532A, a second item 532B, and a third item 532C. In this example, the first item 532A and the second item 532B are owned by the current user. The third item 532C is owned by another user that is associated with one of the third-party user systems 120.

In response to user activation of the remove button 542, a user input signal is transmitted from the user system 110 to the storage system 130 in the form of a removal request with respect to the third item 532C, which has been designated using a selection box 534. In response to the removal request, the storage system 130 selects a removal operation. In this example, the removal operation is excluding the third item 532C from the current view, such that it will no longer appear in the current view. In an alternative example, the selected removal operation can be exclusion of the item from all attributed views for the current user. Either removal operation can be done, for example, by modifying information that associates the third item 532C with the current view, such as a metadata attribute. The removal operation can be selected based on the view type, which in this case is an attribute-based view, and ownership of the third item 532C, which in this case is not owned by the user.

Upon performing the removal operation, the storage system 130 transmits information to the user system 110 that, when processed by the user system 110, causes the user system 110 to display an updated first attribute-based view 500B. The updated first attribute-based view 500B includes a confirmation message 550, which states "one item was removed." The confirmation message 550 also includes an undo link 552 that is operable, when activated by the user, to cause a user input signal to be transmitted to the storage system 130 in the form of an undo request.

Figure 6A:
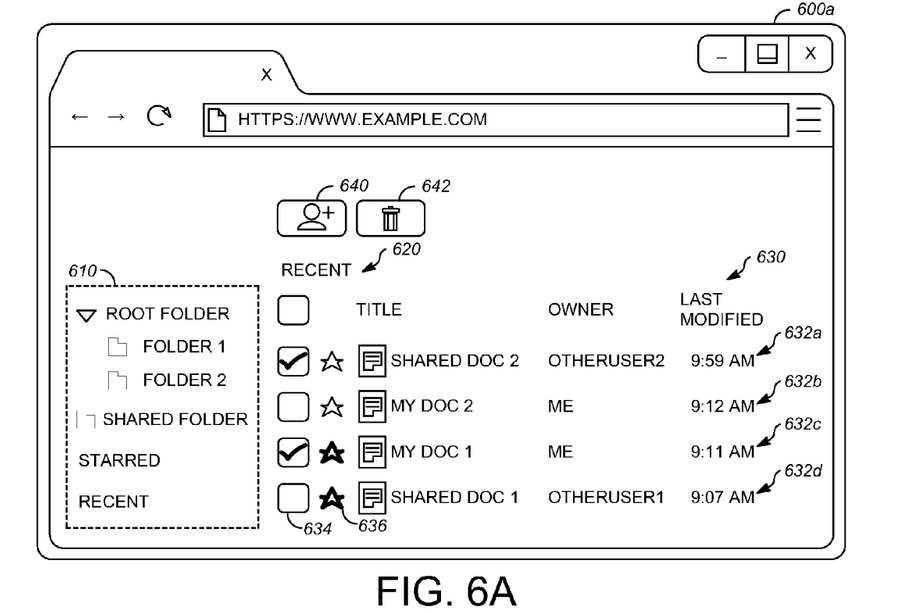
FIGS. 6A-6B are illustrations showing a fourth example removal operation.
Figure 6B:
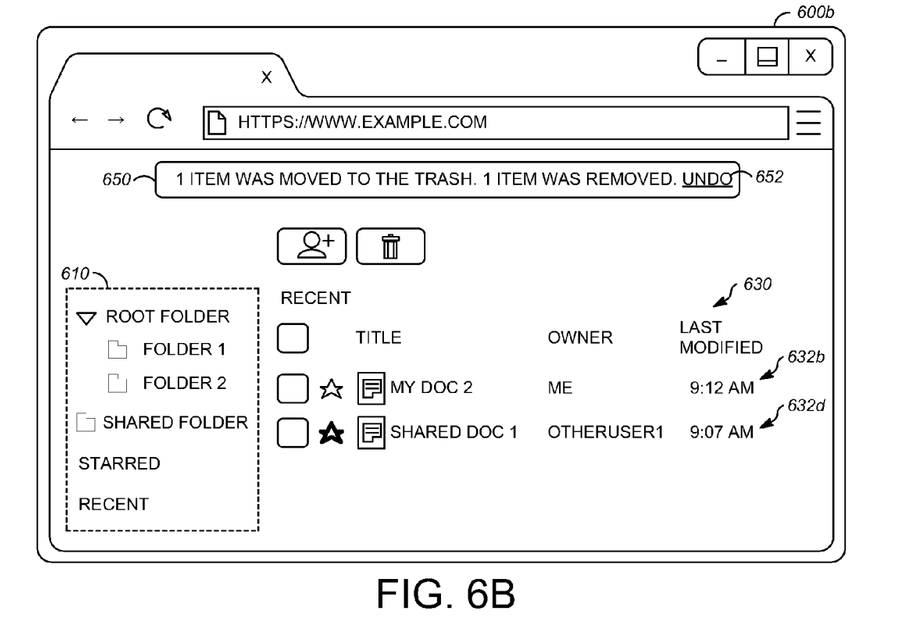

FIGS. 6A-6B are illustrations showing a fourth example removal operation that is performed in the context of an attribute-based view of the shared workspace.

A second attribute-based view 600A (FIG. 6A) includes a navigation area 610, a view title 620, an item list 630, a share button 640, and a remove button 642. The item list 630 includes a first item 632A, a second item 632B, a third item 632C, and a fourth item 632D. The first through fourth items 632A-632D are included in the second attribute-based view based on metadata attributes, which in this case include the time when the items were last modified. In this example, the first item 632A and the fourth item 632D are owned by other users that are associated with the third party user systems 120, and the second item 632B and the third item 632C are owned by the current user.

In response to user activation of the remove button 642, the user input signal is transmitted from the user system 110 to the storage system 130 and identifies the first item 632A and the third item 632C for the removal operation, based on their designation by the user via the selection boxes 634.

In response to the removal request, the storage system 130 selects a removal operation for each of the first item 632A and the third item 632C. The removal operations are selected on an item-by-item basis. In this example, the storage system 130 selects exclusion of the first item 632A from the current attribute-based view, based on predetermined criteria, such as the view type, which in this case is an attribute-based view type, and ownership of the first item 632A, which in this case is owned by a third party user. With respect to the third item 632C, the storage system 130 selects deletion of the third item 632C as the removal operation, based on predetermined criteria, including ownership of the third item 632C by the current user.

Subsequent to performance of the removal operations, the storage system transmits information to the user system 110 that, when processed by the user system 110, causes the user system 110 to display the updated second attribute-based view 600B. The updated second attribute-based view 600B includes a confirmation message 650. The confirmation message 650 describes the removal operations that were performed with respect to each of the first item 632A and the third item 632C, which do not appear in the updated second attribute-based view 600B. In this example, the confirmation message 650 states "One item was moved to the trash. One item was removed." The confirmation message 650 also includes an undo link 652, which, when activated by the user, is operable to transmit a user input signal to the storage system 130 in the form of an undo request, as previously discussed.

Figure 7:
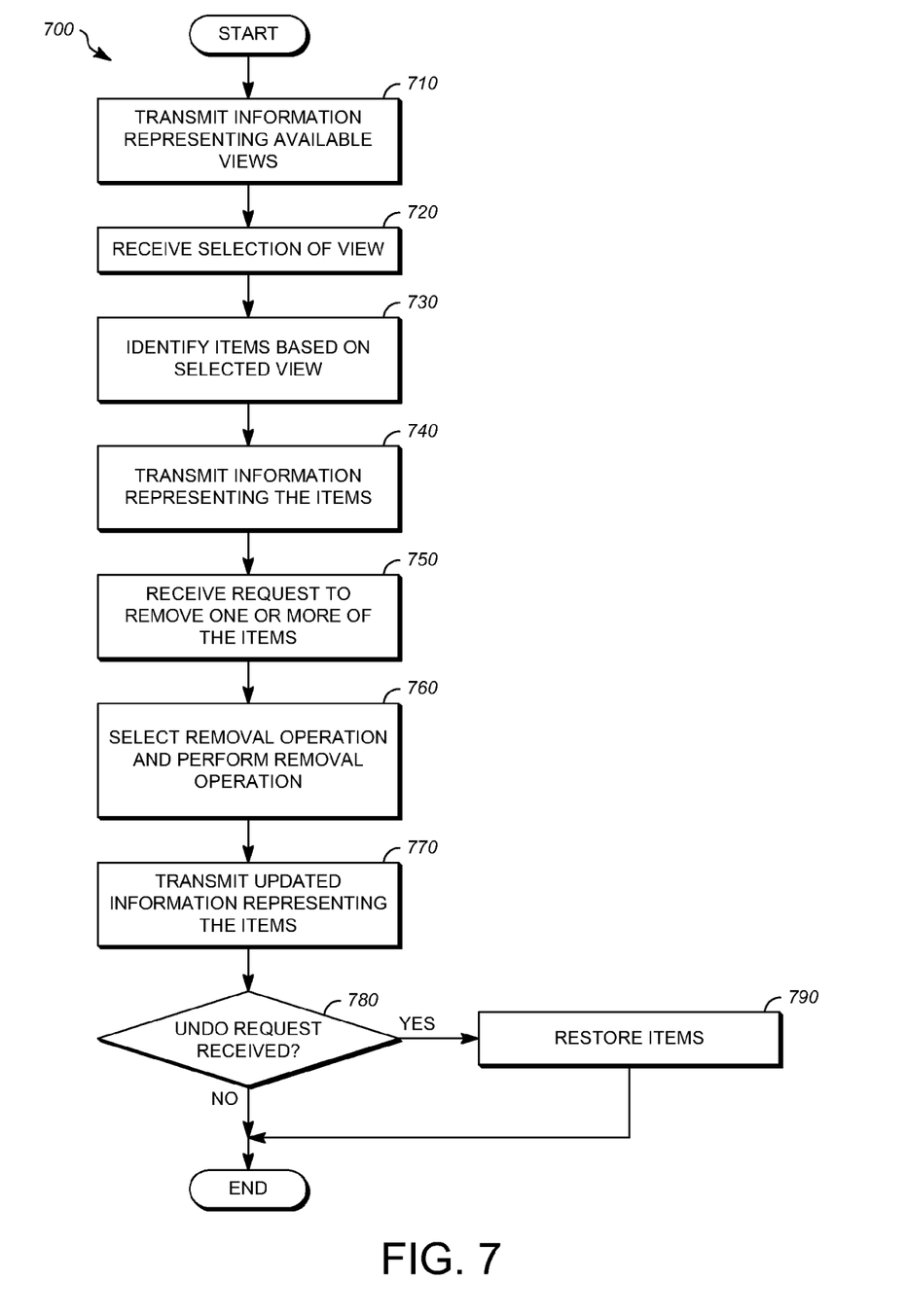
FIG. 7 is a flow chart showing an example of a process for managing items in a shared workspace.

FIG. 7 is a flow chart showing an example of a process 700 for managing items in a shared workspace.

The operations described in connection with the process 700 can be performed at one or more computers, such as at the host computing device 150. When an operation is performed by one or more computers, it is completed when it is performed by one computer. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of the host computing device 150 and be executable by the CPU 210 of the respective host computing device 150.

In operation 710, the storage system 130 transmits information representing one or more available views. In one example, the information representing the one or more available views includes the navigation area 310 of the first folder-based view 300A (FIG. 3A).

In operation 720, the storage system 130 receives information that selects a view from one or more alternative views. As used herein, information, signals, or data are received by transmission or accessing the information, signals, or data in any form, such as receiving by transmission over a network, receiving by accessing from a storage device, or receiving by user operation of an input device. Receiving a selection of a view can include receiving a user input signal at the storage system 130 from the user system 110, where the user input signal selects one of the folder-based view buttons 312 or one of the attribute-based view buttons 314 from the navigation area 310 of the first folder-based view 300A (FIG. 3A).

In operation 730, one or more items are identified based on the selected view. As one example, where the selected view is a folder-based view, the storage system 130 can identify one or more of the items 152 based on the metadata attributes 154, which can specify, for example, that respective ones of the items 152 are included in the selected folder. As another example, with respect to attribute-based views, one or more of the items 152 that satisfy one or more predetermined criteria associated with the selected view can be identified based on the metadata attributes 154.

In operation 740, the storage system 130 can transmit information representing the items to be included in the selected view. This can include, for example, transmitting information from the storage system 130 to the user system 110 that, when processed by the user system 110, causes the user system 110 to display a current view representing the items that are included in the view.

In operation 750, a request to remove one or more of the items from the current view is received. This can include, for example, receiving a user input signal at the storage system 130 from the user system 110, where the user input signal identifies at least one item from the items that are described in the currently-displayed view. In one example, the request to remove one or more of the items is received in response to user activation of a user-operable interface element, such as the remove button 342 of the first folder-based view 300A.

In operation 760, the storage system 130 selects and performs a removal operation with respect to the selected items. The removal operation is selected by the storage system 130 in response to the removal request identifying the items. The removal operation is selected based on one or more predetermined criteria, as will be explained further herein.

In operation 770, the storage system 130 transmits updated information representing the items. This can include transmitting information from the storage system 130 to the user system 110 that, when processed by the user system 110, causes the user system 110 to display an updated view, such as the updated first folder-based view 300B. As part of the updated view, the information can cause the user system to display a confirmation message, such as the confirmation message 350, wherein the confirmation message 350 identifies the removal operation that was performed by the storage system 130. The confirmation message 350 can include a user-operable interface element, such as the undo link 352 that, when activated, causes the user system 110 to transmit an undo request to the storage system 130.

In operation 780, a determination is made as to whether the undo request was received. If the undo request was received, the items to which the removal operation was applied are restored at operation 790, and the process ends. If the undo request is not request at operation 780, the process ends.

Figure 8:
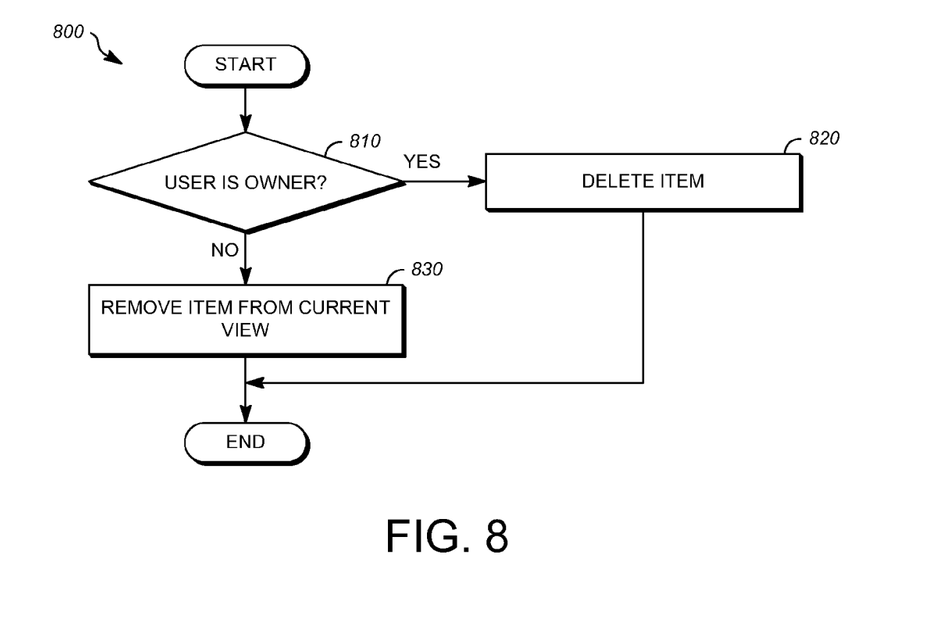
FIG. 8 is a flow chart showing a first example process for selecting a removal operation.

FIG. 8 is a flow chart showing a first example process 800 for selecting a removal operation.

The operations described in connection with the first example process 800 can be performed at one or more computers, such as at the host computing device 150. When an operation is performed by one or more computers, it is completed when it is performed by one computer. The operations described in connection with the first example process 800 can be embodied as a non-transitory computer readable storage medium including program instructions executable by one or more processors that, when executed, cause the one or more processors to perform the operations. For example, the operations described in connection with the first example process 800 could be stored at the memory 220 of the host computing device 150 and be executable by the CPU 210 of the respective host computing device 150.

The first example process 800 selects a removal operation solely on the basis of whether or not the user is the owner of the item with respect to which the removal operation is to be performed. In operation 810, a determination is made as to whether the user is the owner of the item. This can be determined, for example, by comparing the identity of the current user against metadata attributes associated with the item that define one or more owners of the item.

If the current user is the owner of the item, the item is deleted at operation 820. If the current user is not the owner of the item, the item is removed from the current view at operation 830. Subsequent to either of operation 820 or operation 830, the process ends.

Figure 9:
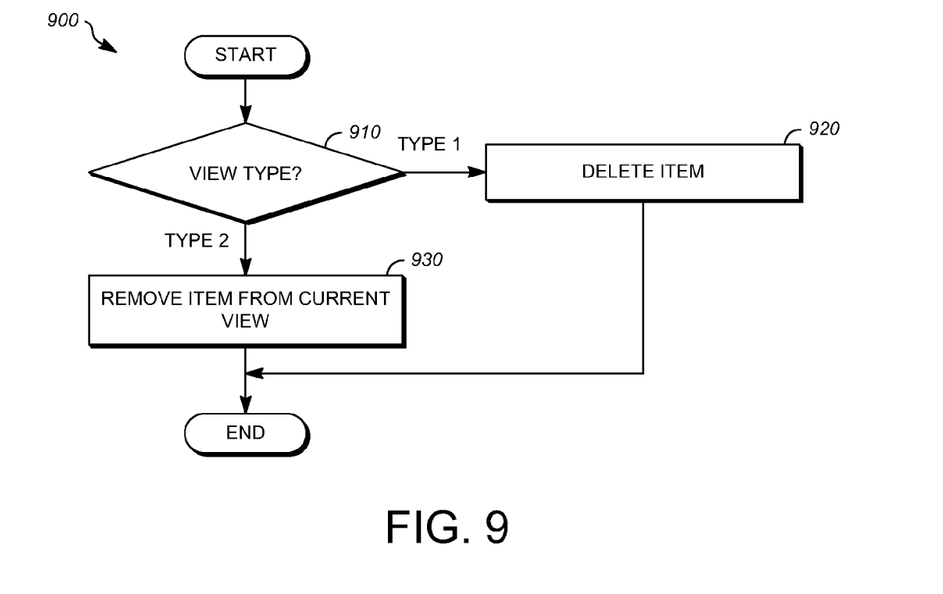
FIG. 9 is a flow chart showing a second example process for selecting a removal operation.

FIG. 9 is a flow chart showing a second example process 900 for selecting a removal operation.

The operations described in connection with the second example process 900 can be performed at one or more computers, such as at the host computing device 150. When an operation is performed by one or more computers, it is completed when it is performed by one computer. The operations described in connection with the second example process 900 can be embodied as a non-transitory computer readable storage medium including program instructions executable by one or more processors that, when executed, cause the one or more processors to perform the operations. For example, the operations described in connection with the second example process 900 could be stored at the memory 220 of the host computing device 150 and be executable by the CPU 210 of the respective host computing device 150.

The second example process 900 selects a removal operation based solely on the view type of the current view. In operation 910, a determination is made as to whether the view type corresponds to a first view type or a second view type. In one example, the first view type is a folder-based view, and the second view type is an attribute-based view. If the view type corresponds to the first view type, the process proceeds to operation 920, where the item is deleted. The process then ends. If the item corresponds to the second view type, the process proceeds to operation 930 from the determination at operation 910, and the item is removed from the current view. The process then ends.

Figure 10:
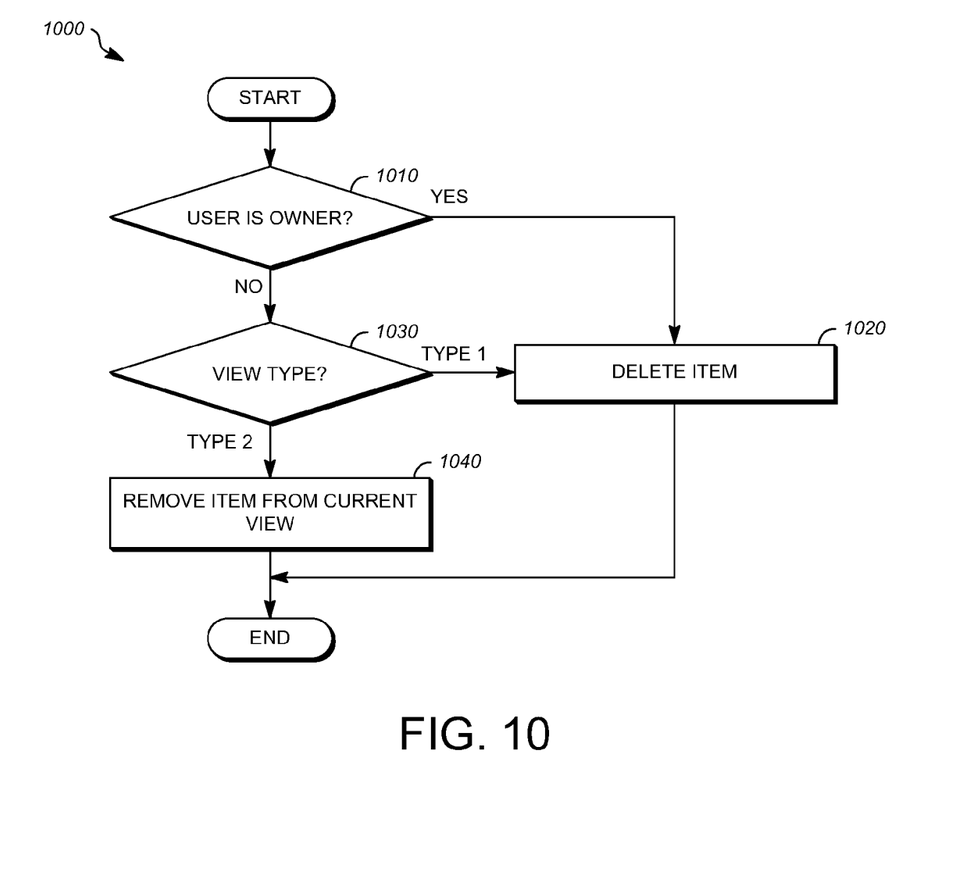
FIG. 10 is a flow chart showing a third example process for selecting a removal operation.

FIG. 10 is a flow chart showing a third example process 1000 for selecting a removal operation.

The operations described in connection with the third example process 1000 can be performed at one or more computers, such as at the host computing device 150. When an operation is performed by one or more computers, it is completed when it is performed by one computer. The operations described in connection with the third example process 1000 can be embodied as a non-transitory computer readable storage medium including program instructions executable by one or more processors that, when executed, cause the one or more processors to perform the operations. For example, the operations described in connection with the third example process 1000 could be stored at the memory 220 of the host computing device 150 and be executable by the CPU 210 of the respective host computing device 150.

The third example process 1000 selects the removal operation based on whether the current user is the owner of the item and additionally based on whether the view type corresponds to a first view type or a second view type. In operation 1010, a determination is made as to whether the current user is the owner of the item. If the current user is the owner of the item, the process proceeds to operation 1020, where the item is deleted. In some implementations, deleting an item is performed by moving the item to a "trash" folder, from which the item is recoverable. The process then ends.

If, at operation 1010, it is determined that the current user is not the owner of the item, the process proceeds to operation 1030. At operation 1030, a determination is made as to whether the view type corresponds to a first view type or a second view type. In one example, the first view type is a folder-based view type, and the second view type is an attribute-based view type. If, at operation 1030, it is determined that the view type is the first view type, the process proceeds to operation 1020, where the item is deleted, and the process then ends.

If, at operation 1030, it is determined that the view type corresponds to the second view type, the process proceeds to operation 1040. At operation 1040, the item is removed from at least one attribute-based view that is associated with the current user. In one implementation, the item can be removed from the current attribute-based view. In another implementation, the item can be removed from all attribute-based views. The process then ends.

In one implementation, as a result of the determinations made at operation 1010 and operation 1030, if the current user does not own the item and the current user is looking at the item in a folder-based view, the item is removed from the folder, which can be a common folder-based view that is shared among multiple users. If the user does not own the item, and the user is looking at the item in an attribute-based view, the item can be removed from all attribute based views that are associated with the current user. In this implementation, the item would still be visible to the user in folder-based views.

The processes described herein can be applied to a single item, to multiple items, or to one or more folders. When performed on a folder, the effect of the operation is carried out on the folder and the items contained in the folder, recursively. For example, in an implementation of third example process 1010 where a removal operation is requested with respect to a folder A, if the user owns the folder A, the folder A is deleted, for example, by moving the folder A to the user's "trash" folder. Additionally, any item contained in the folder A (which may include other folders) that is owned by the user and which is contained in the folder A is moved to the user's trash, recursively if that causes another to be moved to the user's trash. If the user does not own the folder A, and the user is looking at the folder A in a folder B, the folder A is removed from the folder B. No additional recursion is performed. If the user does not own the folder A, and the user is looking at the folder A in an attribute-based view, the folder A is removed from one or more attribute-based views that are associated with the user, such as the current attribute-based view. In addition, all items in folder A that are not owned by the user are removed from one or more attribute-based views that are associated with the user, such as the current attribute-based view. If a folder C is in folder A and is not owned by the user, the folder C is removed from one or more attribute-based views that are associated with the user, such as the current attribute-based view, recursively.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
    storing, at a storage system, an item that can be represented by a file interface screen having a first view type and can be represented by the file interface screen having a second view type that is different than the first view type;
    receiving, at the storage system from a user system, a request for a selected view of the file interface screen, wherein the selected view corresponds to at least one of the first view type or the second view type;
    transmitting, from the storage system to the user system, information that, when processed by the user system, causes the user system to display the selected view, wherein the item is represented in the selected view;
    receiving, at the storage system, a first user input signal that identifies the item;
    identifying, at the storage system and in response to receiving the first user input signal, one of a first removal operation or a second removal operation as a selected removal operation, wherein the first removal operation includes deleting the at least one item, the second removal operation includes modifying information that associates the at least one item with the selected view of the one or more items such that the at least one item no longer appears in the selected view, the first removal operation is identified by the storage system as the selected removal operation if the selected view corresponds to the first view type and the second removal operation is identified by the storage system as the selected removal operation if the selected view corresponds to the second view type; and
    performing, at the storage system, the selected removal operation with respect to the item.

2. The method of claim 1, wherein the first view type is a folder-based view type and the second view type is an attribute-based view type.

3. The method of claim 1, further comprising:
    transmitting, from the storage system to the user system subsequent to performing the selected removal operation, information that, when processed by the user system, causes the user system to display a confirmation message, wherein the confirmation message identifies the selected removal operation.

4. The method of claim 3, wherein the confirmation message includes a user operable interface element that, when activated, causes the user system to transmit an undo request to the storage system, and the storage system reverses the selected removal operation in response to the undo request.

5. The method of claim 1, wherein the storage system is operable to perform each of the first removal operation and the second removal operation with respect to the item.

6. A method comprising:
    transmitting, from a storage system to a user system, information that, when processed by the user system, causes the user system to display a current view representing one or more items that are stored at the storage system;
    receiving, at the storage system, a first user input signal that identifies at least one item from the one or more items that are stored at the storage system;
    identifying, at the storage system and in response to receiving the first user input signal, one of a first removal operation or a second removal operation based a predetermined criteria associated with at least one of the at least one item or the current view as a selected removal operation, wherein the first removal operation includes deleting the at least one item, the second removal operation includes modifying information that associates the at least one item with the selected view of the one or more items such that the at least one item no longer appears in the selected view, the first removal operation is identified by the storage system as the selected removal operation if the predetermined criteria has a first value and the second removal operation is identified by the storage system as the selected removal operation if the predetermined criteria has a second value that is different than the first value;
    performing, at the storage system, the selected removal operation with respect to the at least one item; and
    transmitting, from the storage system to the user system subsequent to performing the selected removal operation, information that, when processed by the user system, causes the user system to display a confirmation message, wherein the confirmation message identifies the selected removal operation, the confirmation message includes, and the storage system reverses the selected a user operable interface element that, when activated by a single user input action, causes the user system to transmit an alternative operation request to the storage system removal operation and performs an alternative operation with respect to the at least one item in response to the alternative operation request.

7. A non-transitory storage medium including program instructions executable by one or more processors that, when executed, cause the one or more processors to perform operations, the operations comprising:

storing, at a storage system, an item that can be represented by a file interface screen having a first view type and can be represented by the file interface screen having a second view type that is different than the first view type;

receiving, at the storage system from a user system, a request for a selected view of the file interface screen, wherein the selected view corresponds to at least one of the first view type or the second view type;

transmitting, from the storage system to the user system, information that, when processed by the user system, causes the user system to display the selected view, wherein the item is represented in the selected view;

receiving, at the storage system, a first user input signal that identifies the item;

identifying, at the storage system and in response to receiving the first user input signal, one of a first removal operation or a second removal operation as a selected removal operation, wherein the first removal operation includes deleting the at least one item, the second removal operation includes modifying information that associates the at least one item with the selected view of the one or more items such that the at least one item no longer appears in the selected view, the first removal operation is identified by the storage system as the selected removal operation if the selected view corresponds to the first view type and the second removal operation is identified by the storage system as the selected removal operation if the selected view corresponds to the second view type; and performing, at the storage system, the selected removal operation with respect to the item.

8. The non-transitory storage medium of claim 7, wherein the first view type is a folder-based view type and the second view type is an attribute-based view type.

9. The non-transitory storage medium of claim 7, further comprising:

transmitting, from the storage system to the user system subsequent to performing the selected removal operation, information that, when processed by the user system, causes the user system to display a confirmation message, wherein the confirmation message identifies the selected removal operation.

10. The non-transitory storage medium of claim 9, wherein the confirmation message includes a user operable interface element that, when activated, causes the user system to transmit an undo request to the storage system, and the storage system reverses the selected removal operation in response to the undo request.

11. The non-transitory storage medium of claim 9, wherein the confirmation message includes a user operable interface element that, when activated by a single user input action, causes the user system to transmit an alternative operation request to the storage system, and the storage system reverses the selected removal operation and performs an alternative operation with respect to the item in response to the alternative operation request.

12. An apparatus, comprising:

one or more processors; and one or more memory devices for storing program instructions used by the one or more processors, wherein the program instructions, when executed by the one or more processors, cause the one or more processors to:

store, at a storage system, an item that can be represented by a file interface screen having a first view type and can be represented by the file interface screen having a second view type that is different than the first view type;

receive, at the storage system from a user system, a request for a selected view of the file interface screen, wherein the selected view corresponds to at least one of the first view type or the second view type;

transmit, from the storage system to the user system, information that, when processed by the user system, causes the user system to display the selected view, wherein the item is represented in the selected view;

receive, at the storage system, a first user input signal that identifies the item;

identify, at the storage system and in response to receiving the first user input signal, one of a first removal operation or a second removal operation as a selected removal operation, wherein the first removal operation includes deleting the at least one item, the second removal operation includes modifying information that associates the at least one item with the selected view of the one or more items such that the at least one item no longer appears in the selected view, the first removal operation is identified by the storage system as the selected removal operation if the selected view corresponds to the first view type and the second removal operation is identified by the storage system as the selected removal operation if the selected view corresponds to the second view type; and perform, at the storage system, the selected removal operation with respect to the item.

13. The apparatus of claim 12, wherein the first view type is a folder-based view type and the second view type is an attribute-based view type.

14. The apparatus of claim 12, wherein the first removal operation includes deleting the item and the second removal operation includes modifying information that associates the item with the selected view of the one or more items such that the at least one item no longer appears in the selected view.

15. The apparatus of claim 12, wherein the program instructions, when executed by the one or more processors, further cause the one or more processors to:

transmit, from the storage system to the user system subsequent to performing the selected removal operation, information that, when processed by the user system, causes the user system to display a confirmation message, wherein the confirmation message identifies the selected removal operation.

16. The apparatus of claim 15, wherein the confirmation message includes a user operable interface element that, when activated, causes the user system to transmit an undo request to the storage system, and the storage system reverses the selected removal operation in response to the undo request.

17. The apparatus of claim 15, wherein the confirmation message includes a user operable interface element that, when activated by a single user input action, causes the user system to transmit an alternative operation request to the storage system, and the storage system reverses the selected removal operation and performs an alternative operation with respect to the item in response to the alternative operation request.

* * * * *